United States Patent Office 3,475,139
Patented Oct. 28, 1969

3,475,139
PROCESS FOR THE SEPARATION OF ALUMINUM CHLORIDE AND TITANIUM TETRACHLORIDE FROM GASEOUS REACTION GASES CONTAINING CHLOROSILANES
Rudolf Schwarz, Gross-Auheim, and Eugen Meyer-Simon, Frankfurt am Main, Germany, assignors to Deutsche Gold- und Silber-Scheideanstalt vormals Roessler, Frankfurt am Main, Germany
No Drawing. Filed Dec. 1, 1967, Ser. No. 687,146
Claims priority, application Germany, Dec. 2, 1966,
D 51,692
Int. Cl. C01b 33/04
U.S. Cl. 23—366    6 Claims

ABSTRACT OF THE DISCLOSURE

Dry process for the separation of $AlCl_3$ and $TiCl_4$ from the gaseous reaction products obtained in the chlorination of silicon and silicon containing substances by passing the gaseous reaction products containing such impurities over a solid alkali metal or alkaline earth metal halide and a reducing metal at an elevated temperature.

BACKGROUND OF THE INVENTION

The present invention relates to a process for separating $AlCl_3$ and $TiCl_4$ contained as impurities from gaseous reaction products obtained in the chlorination of silicon sources.

In the chlorination or hydrochlorination of silicon, for instance, in the form of commercial ferrosilicon, reaction products are obtained primarily composed of $SiCl_4$, $HSiCl_3$ and hydrogen which can be employed for the production of finely divided silica by flame hydrolysis. Such reaction products, however, normally contain about 2 wt. percent of $AlCl_3$ along with small quantities of $TiCl_4$. The separation of $AlCl_3$ from the gaseous reaction mixture, for example, by cooling or a wet wash with, for instance, $SiCl_4$, represents a not to be underestimated problem for the process as it has a great tendency for supersaturation both in the gas phase as well as in solution and therefore can easily lead to clogging of the apparatus.

In the following, for sake of simplicity, the term "chlorination" is used herein to include "hydrochlorination."

It is possible, however, to separate off $TiCl_4$ by a wet wash with recycled $SiCl_4$. However, the $TiCl_4$ content of the wash liquid cannot exceed a certain amount because of the position of the phase equilibrium so that continued withdrawal and processing of large quantities of wash liquid are unavoidable.

It is also known that aluminum and iron chlorides can be removed from mixtures of heavy metal chlorides such as tantalum, niobium and tungsten chlorides by passing vapors of such chlorides over solid NaCl at temperatures between 250° and 550° C. whereby the aluminum and iron chlorides form a melt with the NaCl and can be withdrawn whereas the remaining chlorides remain in the vapor phase.

According to another known process, $AlCl_3$ can be freed from impurities, such as, halides of titanium, vanadium and, especially, iron by converting the products by reduction in the presence of metallic aluminum, to nonsubliming products and evaporating off the $AlCl_3$.

Furthermore, the conversion of $TiCl_4$ by reduction with metallic reducing agents to $TiCl_3$ which, for instance, is used as a catalyst in the polymerization of ethylene, is also known.

DETAILED DESCRIPTION OF THE INVENTION INCLUDING PREFERRED EMBODIMENTS

The object of the invention is to provide a dry process for the simultaneous or substantially simultaneous separation of $AlCl_3$ and $TiCl_4$ from gaseous reaction products obtained in the chlorination of silicon containing substances which avoids the disadvantages described above.

According to the invention, the gaseous reaction products from which the $AlCl_3$ and $TiCl_4$ impurities are to be removed are contacted with at least one solid alkali metal and/or alkaline earth metal chloride, for instance, in a reaction tower and with small quantities of a metallic reducing agent at temperatures above 100° C., preferably, above 150° C., and withdrawing the metal/chloride/alkali metal and/or alkaline earth metal melt which is formed from the alkali metal and/or alkaline earth metal halide, the temperature employed, of course, in each instance being above the melting point of the metal chloride/alkali metal and/or alkaline earth metal chloride complex which is formed.

It was unexpectedly found that vaporized $AlCl_3$ practically completely reacts, even in great dilution, with solid alkali metal and/or alkaline earth metal halides heated over 100° C. with the formation of complex compounds melting at temperatures above 100° C. Surprisingly, this reaction does not come to rest after superficial action on the surfaces of the alkali metal or alkaline earth metal halide granules or lumps as the complex compound formed melts at temperatures below the melting point of the alkali metal or alkaline earth metal halides and when temperatures above the melting point of such complexes are employed the latter drip off from the alkali metal or alkaline earth metal halide granules and the reaction with the $AlCl_3$ proceeds at the surface of the granules.

It furthermore was found that the $TiCl_4$ could be removed from the reaction gases simultaneously with the $AlCl_3$ when the reaction gases are passed over solid alkali metal or alkaline earth metal halides in the presence of a reducing metal powder, whereby the $TiCl_4$ is reduced to $TiCl_3$ which dissolves in the $AlCl_3$/alkali metal and/or alkaline earth metal chloride melt with the formation of complexes and drips off with such melts.

The separation of $AlCl_3$ alone succeeds when the gaseous reaction products are passed over solid alkali metal or alkaline earth metal halide, especially NaCl, at temperatures above 100° C. and, preferably, over 150° C. For this purpose, the gas mixture can be passed through a heated reaction tower filled with lumps of NaCl and subsequently condensing the $SiCl_4$ completely by deep cooling. The quantity of $AlCl_3$ in the $SiCl_4$ condensates and the ratio of $NaCl:AlCl_3$ in the melts which run out of the bottom of the tower can be determined. The $AlCl_3$ content of the $SiCl_4$ condensate remains constant at about 0.01%. The salt melt which runs out of the tower always has a melting point of 150–152° C. which corresponds to a molecular composition of 48 mol percent of NaCl and 52 mol percent of $AlCl_3$ and therefore substantially corresponds to the composition of the complex compound $NaAlCl_4$ which melts at 155.5° C.

The completeness of the separation of the $AlCl_3$ in dependence on the temperature of the NaCl charge in the absorption tower was investigated in the range of 120 to 450° C. It was found that the $AlCl_3$ content in the $SiCl_4$ condensates noticeably increases when the temperatures in the NaCl tower is over 400° C.

With the view of lowering the melting point of the salt melt which runs out, homogeneous equimolar mixtures of NaCl and KCl were used in the absorption tower instead of pure NaCl. In this instance the melt which flowed out of the botom of the tower had the following composition: Cl=71.29%; Al=15.79%; Na=5,28%; K=7.41%.

The ratio of NaCl:KCl in such melt was 1:0.825 and the melting point thereof was 112° C. The AlCl₃ content of the SiCl₄ again was 0.01% as was the case when pure NaCl was used.

The bromides of the alkali metal indicated, such as, KBr, are also suited for the separation of AlCl₃ from the gaseous reaction mixtures concerned. AlCl₃ and KBr form an eutectic with 66 mol percent KBr which melts at 104° C. When AlCl₃ vapor is reacted with solid KBr at about 250° C., the double salt KBr.AlCl₃ with a melting point of 213° C. is formed.

Similarly the halides of lithium are also suited for the separation of the AlCl₃. For example, LiCl forms a eutectic melting at 114° C. with 41 mol percent of LiCl and when AlCl₃ vapor is reacted with solid LiCl at about 180° C., the double salt LiCl/AlCl₃ having a melting point of 143.5° C. runs off.

The separation of AlCl₃ also succeeds with alkaline earth metal halides and especially with $MgCl_2$ in the same manner as with the alkali metal halides. $MgCl_2$ and $AlCl_3$ forms a eutectic melting at 186° C. with 16 mol percent of $MgCl_2$. When $AlCl_3$ vapor is reacted with solid $MgCl_2$ at temperatures over 250° C. the double salt $$MgCl_2 \cdot 2AlCl_3$$

with a melting point of 228° C. is formed.

It also is an essential part of the invention that the TiCl₄, which has not yet been included in the above discussion, which also is contained as impurity in the gaseous reaction products, be removed along with the AlCl₃ with the aid of reducing metal powders, especially, powdered aluminum.

TiCl₄ reacts at temperatures above 100° C., especially in the presence of AlCl₃ with the aluminum powder with the formation of TiCl₃ which dissolves in the melt as Na₃TiCl₆ and is drawn off therewith. Preferably, the quantity of aluminum powder employed is about 0.005 to 0.05 wt. percent with reference to the chlorosilane content of the reaction gases.

The separation of the TiCl₄ can be carried out in a reaction step which is separate from the separation of the AlCl₃ but integrated therewith in that the aluminum powder is not added to the NaCl in the absorption tower but rather to the NaAlCl₄ melt which runs off therefrom and then permitting the Al/AlNaCl₄ dispersion reaction with the TiCl content of the gas mixture in a separate tower. This mode of procedure has the advantages that the metallic reducing agent reacts in uniformly distributed state and that it cannot be blown out by the gas stream.

It also is possible to mix the aluminum powder with the NaAlCl₄ melt withdrawn from the absorption tower and to allow such mixture to solidify and to admix such solidified mixture in crushed state with the salt in the absorption tower.

A partial separation of AlCl₃ with NaCl is also possible at temperatures between 400 and 500° C. At temperatures over 400° C. NaAlCl₄ already possesses a substantial AlCl₃ vapor pressure, for instance, at 500° C. it already is 25 torr so that with rising temperatures the separation become more incomplete and that no AlCl₃ can be separated off in this manner at temperatures over 500° C.

The purified AlCl₃ and TiCl₄ free mixture of SiCl₄ and H₂ can, if it is necessary for the subsequent use of the mixture, be separated into its components in appropriate apparatus.

The following examples will serve to illustrate the invention.

Example 1

A gas mixture, obtained in a Si chlorination process, of 2.6 m.³ H₂ and 1.32 m.³ SiCl₄ (10 kg. SiCl₄) contained 0.2 kg. of AlCl₃ and 0.01 kg. of TiCl₄, corresponding to 2% of AlCl₃ and 0.1% of TiCl₄ with reference to the SiCl₄, as impurities.

This gas mixture was passed through a tower charged with pieces of NaCl, to which a small quantity of aluminum powder had been added, heated to 160° C. The AlCl₃ content reacted with the NaCl with the formation of the Na(AlCl₄) complex melting at 152° C. which ran out of the tower and was collected in a storage vessel. The TiCl₄ content reacted at the same time with the aluminum powder so that it was reduced to TiCl₃ which formed the soluble complex Na₃TiCl₆ with the NaCl in the $$Na(AlCl_4)$$

melt which ran out of the tower. About 5 g. of aluminum powder, for example, are required for the reduction of 0.01 kg. of TiCl₄. 0.008 kg. of TiCl₃ are produced. The AlCl₃ content of the gas mixture after the purification was <0.01% with reference to the SiCl₄ content and TiCl₄ was no longer detectable.

Example 2

The same gas mixture as in Example 1 was passed through a tower charged with small pieces of a homogeneous equimolecular mixture of NaCl and KCl heated to 140° C. The salt melt which ran off from the charge was of the following composition: Cl 71.3%, Al 15.8%, Na 5.3% and K 7.6%. Its melting point was 115 C.

A sufficient quantity of aluminum powder was admixed with a portion of such melt so that its content in Al was about 1%. This aluminum dispersion, after solidification and crushing, was added to the NaCl/KCl charge in the tower where it completely melted at the temperature prevailing so as to distribute the aluminum powder uniformly over the NaCl/KCl charge. Thereafter the TiCl₄ content of the gas mixture was simultaneously removed from the gas mixture as Na₃TiCl₆ and K₃TiCl₆ along with the AlCl₃.

After such treatment of the gas mixture the AlCl₃ content was <0.01% with reference to the SiCl₄ and the TiCl₄ content <0.005%.

Example 3

The same gas mixture as described in Example 1 was passed through a tower heated to 280° C. charged with pieces of completely water free MgCl₂ to which 20 g. of aluminum powder had been added per kg. of MgCl₂.

A melt of the composition MgCl₂·2AlCl₃ which was colored light red by a small quantity of TiCl₃ ran out of the bottom of the tower. Its melting point was between 220 and 225° C. After such treatment of the gas mixture the AlCl₃ content was <0.05% with reference to the SiCl₄ content and the TiCl₄ content was no longer detectable.

Example 4

The same gas mixture as in Example 1 was passed through a tower charged with pieces of NaCl heated to 160° C., whereby the AlCl₃ content reacted with the formation of a NaAlCl₄ melt which ran out of the bottom of the tower. 0.5 wt. percent of zinc dust was then dispersed in such melt and the resulting Zn/NaAlCl₄ dispersion supplied to another tower also charged with pieces of NaCl heated to 180° C., through which the remaining gas mixture was passed so that such dispersion could react with the remaining TiCl₄ content. The NaAlCl₄ melt which ran out of the latter tower contained a small quantity of Na₃TiCl₆ and the unreacted zinc dust. In order that the zinc dust be better utilized the zinc containing melt running out of the bottom thereof may be recycled several times to the tower. The thus purified gas mixture contained <0.05% of AlCl₃ and <0.005% of TiCl₄.

We claim:
1. A dry method for the separation of aluminum chloride and titanium chloride from reaction gases containing chlorosilanes obtained in the chlorination of a silicon source, which reaction gases contain such aluminum chloride and titanium tetrachloride as impurities, which comprises passing said reaction gases over a solid halide product of at least one halide selected from the group consisting of alkali metal halides and alkaline earth metal halides and over a reducing metal at a temperature above the melting point of the reaction product between the aluminum chloride and the solid halide product but below the melting point of the solid halide product, and withdrawing the melted reaction product from the solid halide product.

2. The method of claim 1 in which said reducing metal being selected from the group consisting of aluminum powder and zinc dust.

3. The method of claim 2 in which said reducing metal is admixed with the melting reaction product and is contacted with the reaction gases in such admixture.

4. The method of claim 3 in which said solid halide product is solid sodium chloride.

5. The method of claim 3 in which said solid chloride product is a mixture of sodium and potassium halides.

6. The method of claim 3 in which said reducing metal is aluminum powder and the quantity thereof is about 0.005 and 0.05% with reference to the quantity of chlorosilane in the reaction gases.

References Cited

FOREIGN PATENTS

| | | |
|---|---|---|
| 136,329 | 1961 | U.S.S.R. |
| 1,150,661 | 5/1963 | Germany. |
| 380,092 | 9/1964 | Switzerland. |

EDWARD STERN, Primary Examiner

U.S. Cl. X.R.

23—87, 91, 93, 205